United States Patent [19]

Chesterton et al.

[11] 4,327,923

[45] May 4, 1982

[54] PACKING

[75] Inventors: Arthur W. Chesterton, Prides Crossing, Mass.; Edgar R. Bernier, Nashua, N.H.

[73] Assignee: A. W. Chesterton Company, Stoneham, Mass.

[21] Appl. No.: 79,360

[22] Filed: Sep. 27, 1979

[51] Int. Cl.³ .............................................. F16J 15/16
[52] U.S. Cl. .............................. 277/124; 277/DIG. 6
[58] Field of Search ............... 277/123, 124, 125, 117, 277/DIG. 6, 204, 216, 102

[56] References Cited

U.S. PATENT DOCUMENTS

| 969,255 | 9/1910 | Dorsey | 277/125 |
|---|---|---|---|
| 1,350,553 | 8/1920 | Mack . | |
| 1,464,234 | 8/1923 | Beldam . | |
| 1,505,462 | 8/1924 | Hillman . | |
| 1,655,589 | 1/1928 | Beldam . | |
| 3,048,412 | 8/1962 | Baker . | |
| 3,663,076 | 5/1972 | Valente . | |
| 3,703,228 | 11/1972 | Chana . | |
| 4,006,881 | 2/1977 | Gaillard . | |
| 4,032,159 | 6/1977 | Zitting . | |
| 4,068,853 | 1/1978 | Schnitzler | 277/204 |
| 4,090,719 | 5/1978 | Simanskis . | |
| 4,116,451 | 9/1978 | Nixon . | |

FOREIGN PATENT DOCUMENTS

| 748903 | 7/1933 | France | 277/117 |
|---|---|---|---|
| 254816 | 7/1926 | United Kingdom . | |
| 559736 | 3/1944 | United Kingdom . | |

Primary Examiner—Robert I. Smith

[57] ABSTRACT

A packing assembly comprises a plurality of adjacent solid, compressible, non-resilient, low friction packing rings having cylindrical sealing surfaces forming a continuous sealing surface along the shaft and each solid ring having a pair of converging generally radially extending walls thereby defining a space between the adjacent walls of each pair of adjacent rings and resilient rings in the space between adjacent solid rings.

10 Claims, 5 Drawing Figures

PACKING

This invention relates to machine packings and more particularly to unique packing assemblies for sealing rotating shafts and to graphite packings for such assemblies.

A packing assembly consisting entirely of solid, compressible, non-resilient, low friction packing rings, such as graphite rings, provides a relatively frictionless sealing surface against the rotating shaft suitable for high temperature operation. However, packing rings of graphite and similar materials, being hard and dense, do not easily compress in an axial direction to engage radially against a shaft to form an effective seal. The high force that a seal gland exerts on the graphite packing rings to reduce leakage to an acceptable level may cause excessivley high shaft temperatures due to the pressure on the shaft which cannot be relieved since solid graphite rings lack resilience. The lack of resilience makes precise adjustment to achieve adequate sealing without undue pressure difficult to achieve. Introduction of resilient packing rings, e.g., braided rings of asbestos, or the like, into the assembly, alternating with the graphite rings, has been employed to provide resilience to the assembly and to permit effective sealing without undue sealing pressure. However, the dissimilarity of the coefficients of friction of resilient and graphite packing rings causes uneven shaft wear, greater in the areas in which the resilient packing rings contact the rotating shaft than in the areas contacted by the graphite packing rings. Premature shaft wear is one consequence of such uneven wear. Additionally, high axial compression forces are still required to cause radial displacement for shaft engagement.

It is a principal object of this invention to provide a packing assembly for a rotating shaft which provides a continuous sealing surface of a solid, compressible, non-resilient, low friction material against the shaft, to provide a uniform low coefficient of friction therealong, while providing desirable resilience to permit accurate radial adjustment without undue pressure on the shaft. It is a further object of this invention to provide a unique graphite sealing ring for use in such as assembly.

In general this invention features a packing assembly comprising alternating packing rings of solid, compressible, non-resilience, low friction material and resilient material. The solid rings each have a cylindrical wall defining a sealing surface, adjacent rings abutting to define a continuous cylindrical graphite sealing surface. Each solid ring also has a pair of radial walls extending at convergent angles to define spaces between adjacent rings. Resilient rings are placed in the spaces between adjacent solid rings. The invention, in addition to the assembly, also features solid, i.e., graphite rings per se.

In preferred embodiments the radial walls of each solid ring extend at acute angles to an apex and define in section an equilateral triangle. The solid ring comprises compressed graphite foil or tape. In the assembly, a resilient ring is placed at each end of the assembly and the resilient rings define a continuous surface of resilient material parallel to and spaced from the solid ring sealing surface. Each resilient ring, except the end rings also forms in section an equilateral triangle. The resilient rings are of braided packing material.

Other objects, features and advantages of this invention will be apparent to those skilled in the art from the following detailed description of a preferred embodiment thereof, taken together with the accompanying drawings, in which.

Figure 1:
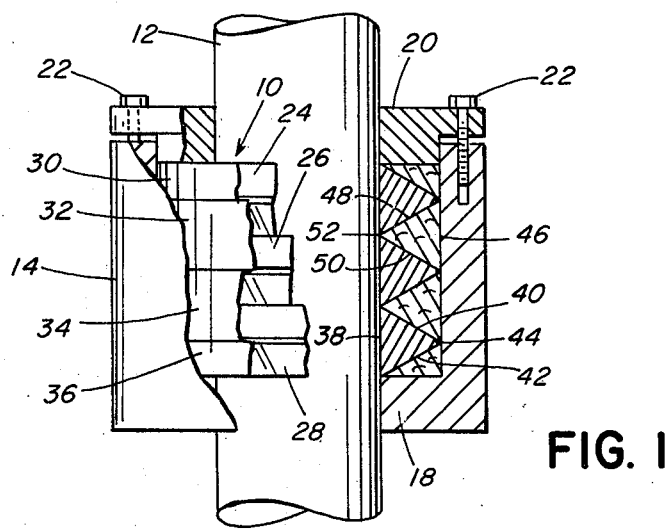
FIG. 1 is an elevation view, partly in section, showing a rotating shaft extending through a stuffing box having a packing assembly according to the invention.

Referring now to the drawings, FIG. 1 illustrates a packing assembly 10 according to a preferred embodiment of the invention. The packing assembly 10 is positioned between a rotating shaft 12 and a housing or stuffing box 14. The shaft 12 extends through stuffing box 14. The stuffing box is spaced from the shaft to define an annular space, in which packing assembly 10 is positioned. One end of stuffing box 14 includes inwardly extending flange 18. Packing assembly 10 is enclosed in stuffing box 14 by seal gland 20 adjustably secured to the other end of stuffing box 14 by means of bolts 22. Within the stuffing box 14, the packing assembly 10 comprises solid, compressible, non-resilient, low friction packing rings 24, 26 and 28, alternating with resilient rings 30, 32, 34 and 36.

Figure 2:
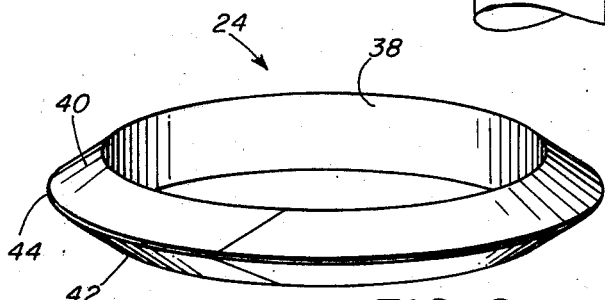
FIG. 2 is an isometric view of a graphite packing ring utilized in the assembly illustrated in FIG. 1.
Figure 3:
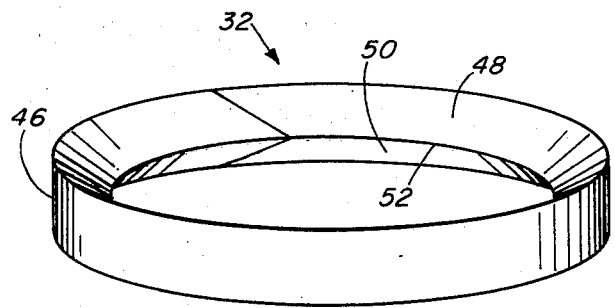
FIG. 3 is an isometric view of a resilient packing ring utilized in the assembly illustrated in FIG. 1.

The rings 24, 26, 28 are shown in FIGS. 1 and 2, and are made of graphite. Each ring is wedge-shaped, triangular in cross-section, with a cylindrical inner sealing surface 38 in sealing engagement with shaft 12. Each graphite ring has two convergent side surfaces 40, 42 which merge at an apex 44. The series of these graphite rings packed around shaft 12, provide a continuous surface of relatively frictionless, self-lubricating graphite against the shaft 12. Other materials than graphite may be used, for example polytetrafluoroethylene, which have low friction characteristics and which can be compressed to a desired shape when subjected to sufficient force, and which will thereafter non-resiliently maintain such desired shaped, i.e., such that upon compression in a stuffing box they will compress or mold to the shaft diameter and maintain that position.

Interposed between and having direct contact with graphite rings 24, 26 and 28, are a series of resilient, braided graphite or asbestos rings 30, 32, 34 and 36. Upper packing ring 30 is provided with one flat face, i.e., extending radially normal to the shaft axis, which bears against the lower face of seal gland 20, and an opposed inclined face 40 adapted to have direct contact with the inclined face of adjacent graphite ring 24. Similarly, lower packing ring 36 is provided with a flat face which bears against flange 18 and as opposed inclined face which has direct contact with graphite ring 28. The rings 32, 34 each comprise an annular body, triangular in cross-section, with a cylindrical outer surface 46 directly against stuffing box 14 and having two convergent side surfaces 48, 50, merging at an apex 52, the sides oriented between the convergent surfaces 40, 42 of the graphite. The resilient rings form a continuous surface against the stuffing box rings. The resilient rings are preferably made of braided graphite fibers; however asbestos fiber braided rings impregnated with conventional impregnants, e.g., polytetrafluoroethylene and a petroleum grease hold their shape better and may be preferred for applications in which the temperature will not exceed the flash point of the impregnant. Other materials, e.g., elastomeric materials, may be suitable for particular applications.

Figure 4:
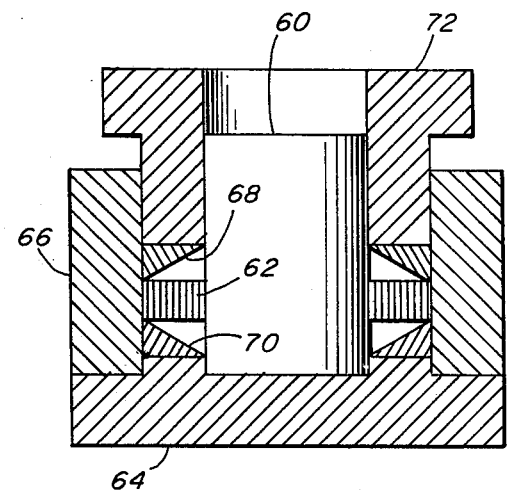
FIG. 4 is a sectional view of a die for forming the packing.
Figure 5:
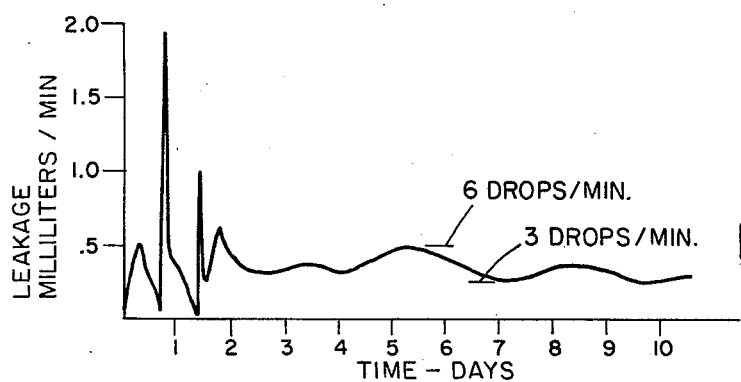
FIG. 5 is a graph which illustrates the performance of a packing assembly according to this invention.

Each solid graphite ring is manufactured by wrapping graphite foil or tape 62 around a mandrel 60 as shown in FIG. 4 and compressing the tape in an appropriately shaped die to 50–60% of its original volume. Approximately 10% compressibility remains in the now-formed graphite triangular-shaped ring. The graphite ring is preferably compressed to within about 10% of its maximum compressibility to still permit further compression while limiting the axial displacement necessary to achieve total desirable compression in use. Each resilient ring is manufactured by winding a length of conventional braided packing around a mandrel and compressing it into a triangular shaped ring in a die. A suitable die for forming the packing rings is illustrated in FIG. 4 and, in addition to mandrel 60, comprises a bottom plate 64 supporting mandrel 60 and outer cylinder 66. Annular wedge shaped die inserts 68,70 are placed in the die above and below the packing material 62. At the top of the die piston 72 is provided for engagement by a press applied to piston 72 moves the upper die insert 68 against packing material 62 to compress and shape the material. Alternatively, graphite powder may be die formed, preferably to a minimum density.

In operation the packing assembly 10 is installed in the stuffing box 14 about shaft 12 with the graphite rings 24,26,28 forming a continuous graphite sealing surface along the shaft 12 within the stuffing box 14, seal gland 20 is then installed and tightened with bolts 22 to compress the packing assembly 10. The shaft is then rotated in normal operation and bolts 22 are adjusted to control the observed leakage.

In one test a packing assembly was set up with a hardened chrome-plated 440 stainless steel shaft sleeve 1.749 in diameter. Four asbestos and three graphite rings were alternately installed in the stuffing box. The graphite rings were compressed to a density of about 1.3 to 1.5. The rings were individually installed and tamped into the stuffing box with joints staggered about the shaft at 90° (the rings were split for ease of installation about the shaft). Upon start-up of the machine, under conditions of 35 psig water pressure with a shaft speed of 1800 RPM at a surface speed of 825 ft/min, it was necessary to back off the seal gland bolts 2 flats to induce leakage. After that initial adjustment, leakage commenced at 1 drop/min, or 0.8 ml/min and then increased and fluctuated during the initial break-in period, as illustrated in FIG. 4. No further adjustment was required, however, and after 10 days, leakage was stabilized at approximately 3 drops/min or 0.25 ml/min. During the test, average leakage was 0.50 ml/min at an average gland temperature of 102° F.

Advantageously, the inclined surfaces of the respective graphite and asbestos rings not only enable the exertion of radial pressure on the graphite rings for sealing a shaft, combined with the resilience of the asbestos rings they permit the graphite rings to expand radially to relieve any internal overpressurization and thus minimize the risk of shaft seizure. Further, the use of the asbestos rings, continuously along the outer diameter of the stuffing box, reduces outer diameter leakage.

Other embodiments of this invention will occur to those skilled in the art which are within the scope of the following claims.

What is claimed is:

1. A packing assembly comprising a plurality of solid, compressible, non-resilient, low friction packing rings, and a plurality of resilient packing rings, a resilient ring positioned between each pair of solid packing rings, characterized in that said solid rings each have a cylindrical wall defining a sealing surface and a pair of walls extending generally radially at converging angles from said cylindrical wall, said solid rings each abutting adjacent said rings whereby said cylindrical walls of said solid rings define a continuous sealing surface of said solid rings along the axial extent of said solid rings and the angular extensions of said pairs of walls of said solid rings defining spaces between adjacent solid rings away from said cylindrical walls thereof, and further characterized in that a resilient ring is positioned in each space between adjacent solid rings whereby an axial force exerted on said assembly causes a radial component of force to be exerted on said solid rings by said resilient rings.

2. The packing assembly claimed in claim 1 further characterized in that a resilient ring is positioned at each end of said assembly against the solid rings thereat.

3. The packing assembly claimed in claim 1 further characterized in that said resilient rings abut each other beyond the radial extent of said solid rings and define a continuous cylindrical surface of said resilient material parallel to and spaced from said continuous sealing surface of said solid rings.

4. The packing assembly claimed in claim 1 further characterized in that said pair of walls of each said solid ring converge at an apex, said ring having a triangular cross section, and each said resilient ring positioned between solid rings has a pair of walls, extending from a cylindrical wall, radially extending to an apex along said converging angles of the adjacent walls of said solid rings.

5. The packing assembly claimed in claim 4 further characterized in that said resilient rings abut each other beyond the radial extent of said solid rings and define a continuous cylindrical surface of said resilient material parallel to and spaced from said continuous sealing surface of said solid rings.

6. The packing assembly claimed in claim 5 further characterized in that said pairs of walls of said solid and said resilient rings comprise the walls of equilateral triangles and said cylindrical walls of said rings comprise the bases thereof.

7. The packing assembly claimed in claim 5 further characterized in that a resilient end ring is positioned at each end of the assembly against the solid rings thereat, each said resilient end ring has one radially extending wall extending at an angle complementary to the adjacent radially extending wall of the adjacent solid ring and another radially extending wall extending at an angle normal to the axis of said packing assembly, said radially extending walls of each said resilient end ring converging at an apex.

8. The packing assembly claimed in any one of claims 1, 2, 3, 4, 5, 6, or 7 further characterized in that said solid rings comprise partially compressed graphite.

9. The packing assembly claimed in claim 8 further characterized in that said resilient rings comprise braided packing material.

10. The packing assembly claimed in claim 9 further characterized in that said graphite rings comprised graphite foil or tape and are compressed to about 10% of their maximum compression.

* * * * *